Jan. 20, 1959 — O. F. SANDERS — 2,869,762

FLUID DISPENSER

Filed March 4, 1957

INVENTOR.
ORVILLE F. SANDERS
BY
Charles Richard Werner
ATTORNEY

United States Patent Office 2,869,762
Patented Jan. 20, 1959

2,869,762

FLUID DISPENSER

Orville F. Sanders, Chicago, Ill.

Application March 4, 1957, Serial No. 643,645

5 Claims. (Cl. 222—382)

This invention relates in general to fluid dispensers and in particular to a removable dispenser insertable in the neck of a container and having a valved piston which will force fluid from the dispenser on one stroke and recharge the dispenser on the reverse stroke.

Although it is realized that the prior art shows dispensers of many types none of those seen employ the same combination of elements which I use to produce a simple, inexpensive dispenser, easy to manufacture, positive in operation and can easily be disassembled for cleaning purposes.

Such dispensers are very useful in dispensing catsup, mustard, syrup and other fluid foods and condiments, as well as other fluids not necessarily in the food line. With many such fluids it is of prime importance that the dispenser be capable of quick and easy disassembly in order to thoroughly clean same after a period of use and prior to reuse.

It is also important that the dispenser be easily attachable and detachable in relation to the container.

The objects of the invention are, therefore, to provide a fluid dispenser to be used in combination with a container having a neck thereon, means for securing the dispenser to the neck of the container, a cylinder insertable in the neck, a tube leading from the cylinder to the lower end of the container, a piston in the cylinder, apertures in the piston and a valve on the piston to close the apertures on one stroke and to open to permit flow of fluid through the apertures on the opposite stroke.

Another object of my invention is to provide a fluid dispenser which can be easily assembled and disassembled for ease in cleaning.

One more object of my invention is to provide a fluid dispenser employing a piston, peripheral apertures in the piston, a flexible valve centrally supported in concentric relation to the piston, the peripheral portion of the valve being adapted to seal the apertures on one stroke of the piston and to flex to open position to permit flow of fluid through the apertures on the reverse stroke of the piston.

Other objects and advantages as well as the construction and operation of my invention will be apparent by reference to the following description in connection with the accompanying drawing in which.

Figure 1:
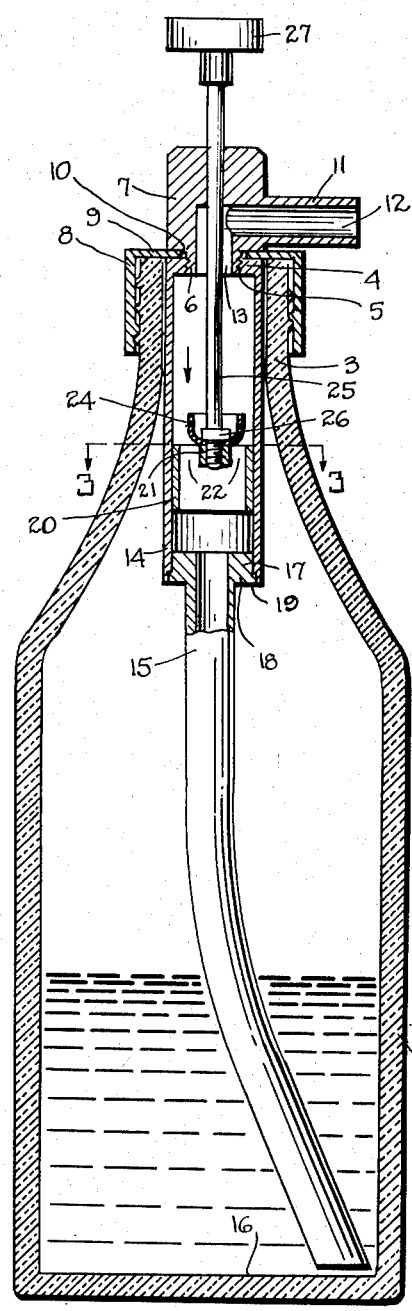
Fig. 1 is a vertical cross sectional view through my dispensing device mounted in a container with the piston on the downstroke.
Figure 2:
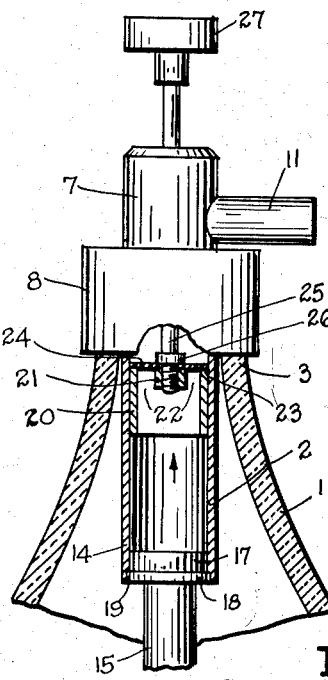
Fig. 2 is a similar view with the piston on the upstroke, only a fragmentary portion of the container being shown.

Referring now to the drawing by numerals of reference, 1 designates a container which may be of any suitable construction, in this instance representing a catsup bottle or the like.

A cylinder 2 is adapted to fit the neck 3 of the bottle and has an inturned end flange 4 with threaded aperture 5 to which the reduced threaded end 6 of a dispensing head 7 is engaged.

A cap 8 is threadedly received by the container 1 and has inturned flange 9 with central aperture 10 through which reduced threaded end 6 of head 7 may project. Tightening of head 7 into cylinder 2 will securely hold cap 8 therebetween.

The dispensing head 7 is provided with offset spout 11 with duct 12 therethrough, the duct opening into the cylinder 2 at 13.

The end 14 of the cylinder 2 is provided with an intake tube 15 which extends downwardly to close proximity with the bottom 16 of the container 1. The tube may be offset as shown. The cylinder end of the tube is provided with an enlarged end 17 which snugly fits the inside of the cylinder 2 and a peripheral flange 18 on end 17 acts as a stop in the annular seat 19 of the cylinder.

A hollow piston 20 is positioned in the cylinder and has a bridge 21 at its upper end. The piston has apertures 22 and an annular seat 23 against which flexible valve 24 may seat. A stem 25 is threadedly secured to piston at the bridge and has a stop flange 26 which bears against the valve 24 when the stem is assembled to the piston. The stop is of just sufficient diameter to hold the valve and not to interfere with its flexing, thereby permitting ample opening of the valve for its intended purpose.

The stem 25 extends through the dispensing head 7 and threadedly engages knob 27 by means of which the piston may be actuated.

Figure 3:
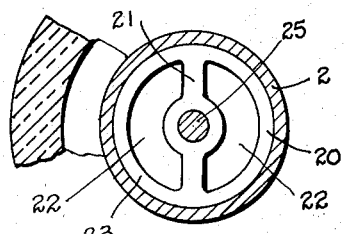
Fig. 3 is a cross sectional view on the line 3—3 of Fig. 1 showing the piston and apertures therein.
Figure 4:
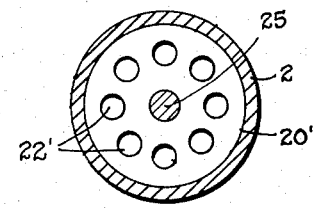
Fig. 4 is a similar view through an alternate form of piston with a plurality of apertures annularly arranged.

The apertures 22 in the piston may be as shown in Fig. 3 or as shown in Fig. 4 where a plurality of apertures 22' are spaced about the periphery of the piston. It is essential that the apertures give the greatest freedom of fluid movement at the peripheral edge of the piston where the valve 24 will flex the greatest amount as shown in Fig. 1.

In operation, after the cylinder 2 is primed by a sufficient number of strokes of the piston, dispensing of the fluid from spout 11 is accomplished by pulling on knob 27 to effect an upward stroke of piston 20, the valve 24 bearing against annular seat 23 of the piston and closing apertures 22. Fluid in the cylinder will be forced out while at the same time fluid from within the container will be drawn into the cylinder.

On the downstroke of piston 20, valve 24 will be forced off its seat and the piston will move freely through the fluid to the bottom of the cylinder preparatory to another pumping stroke.

It will readily be seen that, with the tube 15 close to the bottom of the container 1, practically the entire contents of the container will be discharged without any waste. In catsup containers particularly, and in other containers of fluid as well, a great deal of the contents of the container is wasted because it cannot be dispensed. Using a dispenser such as mine, the contents of the container always gravitates to the bottom for discharge through the dispenser.

The dispenser may be made of any suitable material which may be noncorrosive and acidproof. Certain plastics or other synthetic materials are suitable as well as plated brass or copper, stainless steel and the like.

It is a simple matter to disassemble and clean the dispenser whenever necessary so that it can be kept in sanitary condition.

Obviously, changes in form, proportion and details of construction may be resorted to without departing from the spirit of my invention and I reserve all rights to such changes as come within the scope of these claims and the specifications.

What I claim as new and desire to secure by Letters Patent is:

1. In a dispensing pump for use in combination with a container having a neck thereon, a cylinder receivable through the neck, a dispensing head having a reduced threaded portion received by the cylinder, a cap having a flange directed axially inwardly and receivable between the dispensing head and the cylinder, internal threads on the cap adapted to cooperate with the neck of the container, an intake tube projecting from the lower end of the cylinder, a piston in the cylinder, apertures in the piston, a stem carried by the piston and slidably extending through the dispensing head, a knob on the upper end of the stem, a flexible valve carried by the stem and normally covering the apertures in the piston on the upward stroke of the piston, said valve flexing away from the apertures on the downward stroke of the piston against a fluid in the container.

2. In a dispensing pump for use in combination with a container having a neck thereon, a cylinder receivable through the neck, a dispensing head having a reduced threaded portion received by the cylinder, a cap having a flange directed axially inwardly and receivable between the dispensing head and the cylinder, internal threads on the cap adapted to cooperate with the neck of the container, an intake tube projecting from the lower end of the cylinder, a piston in the cylinder, apertures about the peripheral edge of the piston, a stem carried by the piston and slidably extending through the dispensing head, a knob on the upper end of the stem, a flexible valve carried at its central portion by the stem and normally covering the apertures in the piston on the upward stroke thereof, said valve flexing away from the apertures on the downward stroke of the piston against a fluid in the container.

3. In a dispensing pump for use in combination with a container having a neck thereon, a cylinder receivable through the neck, a dispensing head having a reduced threaded portion received by the cylinder, a cap having a flange directed axially inwardly and receivable between the dispensing head and the cylinder, internal threads on the cap adapted to cooperate with the neck of the container, an intake tube projecting from the lower end of the cylinder, a piston in the cylinder, apertures in the piston, a stem threadedly carried by the piston and slidably extending through the dispensing head, a knob on the upper end of the stem, a stop ring on the stem adjacent the piston end thereof, a flexible valve having its central portion securely held between the stop ring and the piston, the peripheral edge of the valve firmly seating on the piston to cover the apertures when the piston is moved in one direction and flexing freely to open position when the piston is moved in the opposite direction against a fluid in the container.

4. In a dispensing pump for use in combination with a container having a neck thereon, a cylinder receivable through the neck, a dispensing head having a reduced threaded portion received by the cylinder, a cap having a flange directed axially inwardly and receivable between the dispensing head and the cylinder, internal threads on the cap adapted to cooperate with the neck of the container, an intake tube projecting from the lower end of the cylinder, a hollow piston in the cylinder, a bridge across the piston, a stem threadedly secured to the bridge, apertures between the bridge and the peripheral edge of the piston, said stem slidably extending through the dispensing head, a knob on the upper end of the stem, a flexible valve carried by the stem at its juncture with the bridge of the piston, the peripheral edge of the washer being free to flex away from the apertures to permit entry of fluid therethrough and to bear against the peripheral edge of the piston to seal the apertures on the pumping stroke of the piston.

5. In a fluid dispensing pump for use in combination with a container having a neck thereon, means for detachably securing the pump to the neck of the container, said pump having a cylinder receivable through the neck of the container, an intake tube projecting from the lower end of the cylinder, a piston in the cylinder, a stem on the piston projecting externally of the pump, apertures in the piston, a flexible valve having its central portion fixed between the stem and the piston, the outer peripheral portion of the flexible valve normally closing the apertures when the piston is moved upwardly to pump fluid from the cylinder, and opening when the piston is moved downwardly to permit the piston to move through the fluid.

References Cited in the file of this patent

UNITED STATES PATENTS

| | | |
|---|---|---|
| 1,553,805 | Eckert | Sept. 15, 1925 |
| 1,801,066 | Bastian | Apr. 14, 1931 |
| 2,547,109 | Bacheller | Apr. 3, 1951 |